US009787145B2

(12) United States Patent
Baek et al.

(10) Patent No.: US 9,787,145 B2
(45) Date of Patent: Oct. 10, 2017

(54) POWER GENERATING APPARATUS USING MAGNETIC FORCE AND CONTROL METHOD

(71) Applicants: Seong-Ryong Baek, Gyeongsan-si (KR); Song-I Baek, Seoul (KR); Shin-Young Baek, Gyeongsan-si (KR); Se-Ra Baek, Gyeongsan-si (KR); Yung Baek, Gyeongsan-si (KR)

(72) Inventors: Seong-Ryong Baek, Gyeongsan-si (KR); Song-I Baek, Seoul (KR); Shin-Young Baek, Gyeongsan-si (KR); Se-Ra Baek, Gyeongsan-si (KR); Yung Baek, Gyeongsan-si (KR)

( * ) Notice: Subject to any disclaimer, the term of this patent is extended or adjusted under 35 U.S.C. 154(b) by 240 days.

(21) Appl. No.: 14/811,643

(22) Filed: Jul. 28, 2015

(65) Prior Publication Data
US 2015/0333574 A1   Nov. 19, 2015

Related U.S. Application Data

(63) Continuation-in-part of application No. PCT/KR2013/010202, filed on Nov. 11, 2013.

(30) Foreign Application Priority Data

Feb. 27, 2013 (KR) .......................... 10-2013-0021261

(51) Int. Cl.
*H02K 35/04* (2006.01)
*H02K 1/17* (2006.01)
(Continued)

(52) U.S. Cl.
CPC ................. *H02K 1/17* (2013.01); *F03G 7/10* (2013.01); *H02K 35/04* (2013.01); *H02K 53/00* (2013.01); *H02P 6/16* (2013.01)

(58) Field of Classification Search
CPC .......... H02K 1/17; H02K 35/04; H02K 53/00; H02N 11/00–11/008
See application file for complete search history.

(56) References Cited

U.S. PATENT DOCUMENTS

| 4,456,858 | A | * | 6/1984 | Loven | .................... | H02K 29/10 |
| | | | | | | 310/156.38 |
| 5,304,881 | A | * | 4/1994 | Flynn | .................... | H02K 19/02 |
| | | | | | | 310/114 |

(Continued)

FOREIGN PATENT DOCUMENTS

| JP | 06-137261 A | 5/1994 |
| JP | 2009-071985 A | 4/2009 |

(Continued)

*Primary Examiner* — Ramon M Barrera
(74) *Attorney, Agent, or Firm* — Novick, Kim & Lee, PLLC; Jae Youn Kim (57) ABSTRACT

Provided is a power generation device using magnetic force, the power generation device comprising: a plurality of tunnel-type bodies having unilateral open passages and arranged and fixed at the same intervals on a revolutional orbit, wherein the respective tunnel-type bodies are provided with a plurality of permanent magnets between inner magnetic bodies and outer magnetic bodies, and permanent magnets and the outer magnetic bodies are attached to the outer surface of the inner magnetic bodies such that the permanent magnets facing the inner and outer magnetic bodies can have opposite polarities, thereby forming magnetic fields in inner body spaces; and magnetic border membranes having opposite magnetic poles on the inner and outer sides thereof and formed on entrance sides and exit sides of the tunnel-type bodies.

14 Claims, 6 Drawing Sheets

(51) Int. Cl.
    *H02P 6/16*     (2016.01)
    *H02K 53/00*     (2006.01)
    *F03G 7/10*     (2006.01)

(56) References Cited

U.S. PATENT DOCUMENTS

| | | | | |
|---|---|---|---|---|
| 7,268,454 B2 * | 9/2007 | Wise | ............... | H02K 7/025 |
| | | | | 310/103 |
| 8,981,608 B2 * | 3/2015 | Ariel | ............... | H02K 7/06 |
| | | | | 310/103 |

FOREIGN PATENT DOCUMENTS

| | | |
|---|---|---|
| JP | 2012-041909 A | 3/2012 |
| KR | 2001-0020841 A | 3/2001 |
| KR | 2002-0015481 A | 2/2002 |
| KR | 10-0367968 B1 | 1/2003 |
| KR | 10-2009-0007456 A | 1/2009 |
| KR | 10-2009-0123837 A | 12/2009 |
| KR | 10-2011-0116983 A | 10/2011 |

* cited by examiner

POWER GENERATING APPARATUS USING MAGNETIC FORCE AND CONTROL METHOD

CROSS REFERENCE TO RELATED APPLICATIONS

This application is a continuation-in-part of international patent application PCT/KR2013/010202 filed on Nov. 11, 2013, which claims priority to Korean patent application 10-2013-0021261 filed on Feb. 27, 2013, the entire contents of which are hereby incorporated by reference.

TECHNICAL FIELD

The present invention relates to a power generation device using magnetic force, and more particularly to a power generation device which generates power through revolution of electromagnets using magnetic force generated at the insides and outsides of tunnel-type bodies having permanent magnets attached thereto.

BACKGROUND ART

In general, there are many devices and systems using magnetic force or magnetic fields of magnets.

As one example of the prior art, Korean Patent Laid-open Publication No. 10-2001-0020841 discloses "RF body coil" using a magnetic resonance imaging system, and Korean Patent Laid-open Publication No. 10-2001-0075537 discloses "Space defining structure for magnetic homogenization" in which a magnetic field within an inner space is homogenized so as to minimize malfunction or failure of electronic equipment within a house or an office or a negative influence on an organization due to localized geomagnetic disturbance.

Further, Korean Patent Laid-open Publication No. 10-2009-0007456 discloses "Magnetic power transmission device" which may improve power transmission efficiency and transmission capacity and reduce manufacturing costs while maintaining advantages of transmission of power through magnetic force, and Korean Patent Laid-open Publication No. 10-2011-0116983 discloses "Power generation device using gravity and magnetic force" which may indefinitely acquire rotating power as long as a rotation propulsion unit connected to a driving motor moves the position of a floating weight at small driving force in an initial stage.

If a method for more easily generating power with simple parts using such varied magnetic force is actually implemented, such a method will be very popular with many people.

DISCLOSURE

Technical Problem

Therefore, the present invention has been made in view of the above problems, and it is an object of the present invention to provide a device which may be actually implemented using magnetic force of tunnel-type bodies having permanent magnets attached thereto and more effectively generate power with simple parts.

Technical Solution

In accordance with an aspect of the present invention, the above and other objects can be accomplished by the provision of a power generation device using magnetic force, the power generation device including a plurality of tunnel-type bodies (4) having unilateral open passages (47) and fixedly arranged at the same interval on a revolution orbit (2), a plurality of permanent magnets being provided between an inner magnetic body (45) and an outer magnetic body (46) of each tunnel-type body (4) such that the permanent magnets (40) facing the inner and outer magnetic bodies (45, 46) have opposite polarities so as to form magnetic fields within body inner spaces (6), magnetic border membranes (14) formed in outer spaces (8) between the neighboring tunnel-type bodies (4) so as to form magnetic fields having the opposite pole to the pole of the magnetic fields formed in the inner spaces (6) and having opposite poles on the inner and outer surfaces thereof, provided at entrance sides (10) and exit sides (12) of the tunnel-type bodies (4), electromagnets (20) prepared in the same number as the number of the tunnel-type bodies (4) and installed on the revolution orbit (2) so as to revolve along the revolution orbit (2), and a revolution driving unit (50) configured to change polarity of the electromagnets (20) so that the electromagnets (20) placed on the revolution orbit (2) may revolve via the tunnel-type bodies (4) and the magnetic border membranes (24).

Advantageous Effects

A power generation device in accordance with present invention may use magnetic force formed in the inner and outer spaces of tunnel-type bodies having permanent magnets attached thereto and magnetic border membranes and generate power through polarity change control of electromagnets placed on a revolution orbit, thus having a simple structure, being actually implementable and obtaining varied power which satisfies consumer requirements.

DESCRIPTION OF DRAWINGS

The above and other objects, features and other advantages of the present invention will be more clearly understood from the following detailed description taken in conjunction with the accompanying drawings, in which.

BEST MODE

Hereinafter, preferred embodiments of the present invention will be described with reference to the annexed drawings.

Figure 1:
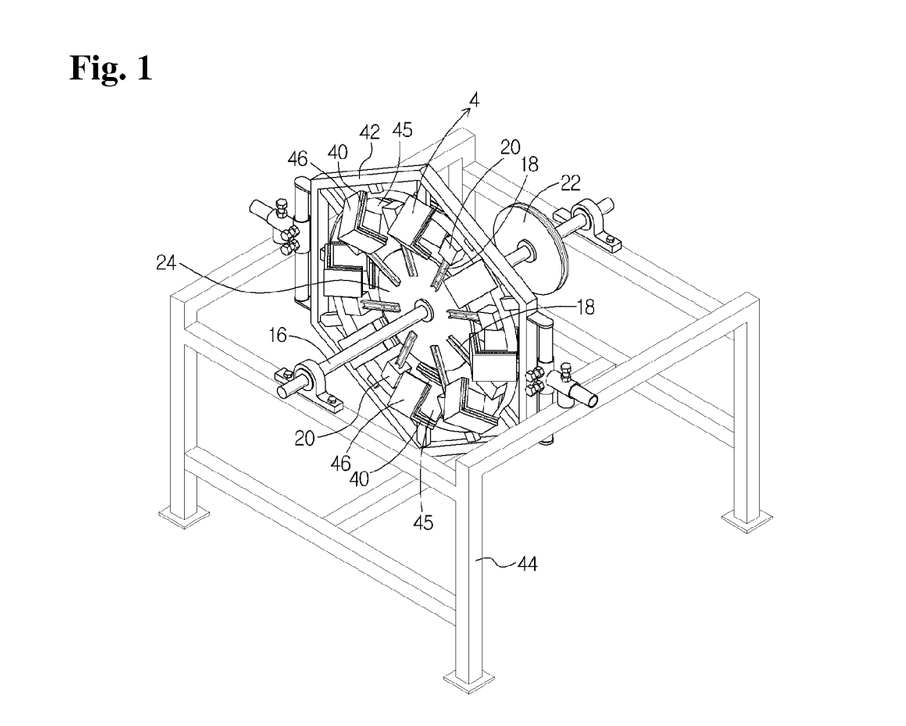
FIG. 1 is a perspective view of a power generation device using magnetic force of tunnel-type bodies having permanent magnets attached thereto, in accordance with one embodiment of the present invention.
Figure 2:
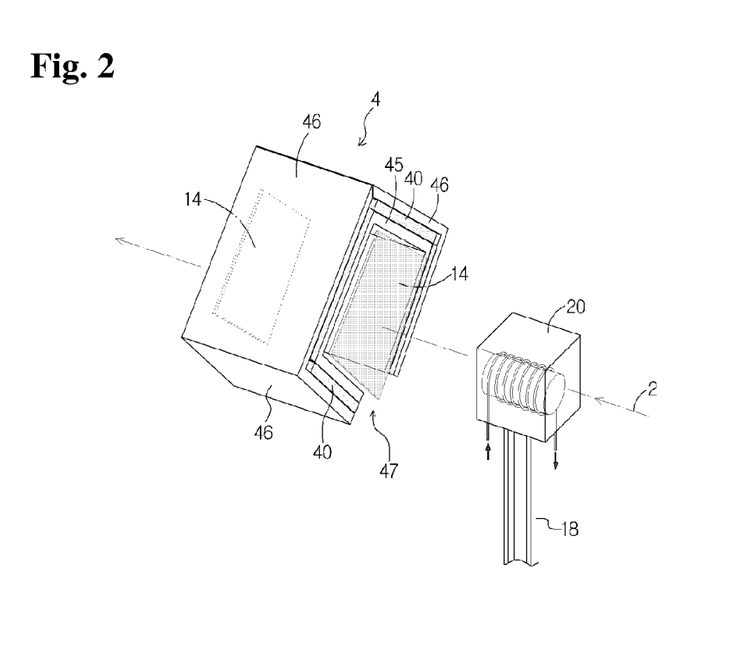
FIG. 2 is a perspective view of an essential portion of the tunnel-type body and an electromagnet revolving along a revolution orbit of FIG. 1.
Figure 3:
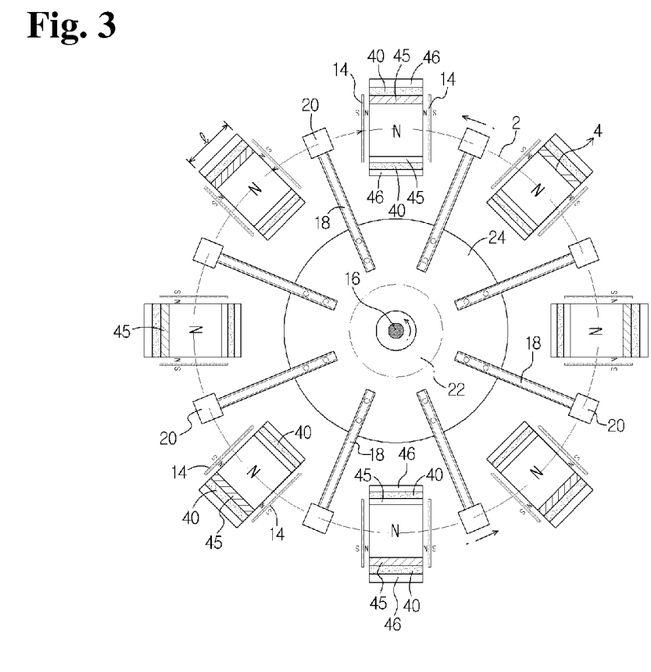
FIG. 3 is a conceptual view of the power generation device in accordance with the present invention.

FIG. 1 is a perspective view of a power generation device using magnetic force of tunnel-type bodies 4 and magnetic force in accordance with one embodiment of the present invention, FIG. 2 is a perspective view of an essential portion of an electromagnet 20 revolving along a revolution orbit 20 on which the tunnel-type bodies 4 are placed, and FIG. 3 is a conceptual view of the power generation device in accordance with the present invention.

A power generation device in accordance with one embodiment of the present invention is configured such that an rotary shaft 16 connected to a power transmission unit 22 is installed across the left and right sides of a main body frame 44 and a plurality of electromagnets 20 is mounted on the rotary shaft 16 along the outer circumference of a rotary disc 24. The electromagnet 20 is formed by winding a coil on a ferromagnetic substance, such as an iron core, and becomes a magnet when current flows therethrough. In the present invention, the electromagnets 20 are configured such that the length direction of the ferromagnetic substance is the same as the direction of the revolution orbit 20.

The tunnel-type bodies 4 provided in number corresponding to the number of the electromagnets 20 are provided on the revolution orbit 2, i.e., the revolving path of the electromagnets 20.

The tunnel-type body 4 in accordance with the present invention includes an inner magnetic body 45 and a plurality of permanent magnets 40 stacked on each other is attached to the outer surface of the inner magnetic body 45, and an outer magnetic body 46 is attached to the outer surface of the inner magnetic body 45 with the permanent magnets 40 attached thereto.

The tunnel-type body 4 is a body having a unilateral open passage 47 through which the electromagnets 20 may pass, and the tunnel-type bodies 4 are arranged on a ring-type bracket 42 installed on the main body frame 44 at the same interval. The tunnel-type bodies 4 may be magnetic bodies to which magnets may be attached.

The tunnel-type body 4 may be a polygonal body having a rectangular or octagonal shape or a cylindrical body and, preferably, be a cylindrical body 4a (in FIG. 9) having an opened passage at one side thereof.

The tunnel-type body 4 having the unilateral open passage 47 is fixed to a front end of an arm 18 and arranged on the revolution orbit 2 of the electromagnets 20 revolving axially and the electromagnet 20 fixed to a front end of an arm 18 may pass through the inside of the tunnel-type body 4 via the unilateral open passage 47.

In the present invention, the permanent magnets 40 are attached to the outer surface of the inner magnetic body 45. The permanent magnets 40 formed of a ferromagnetic substance are provided between the inner magnetic body 45 and the outer magnetic body 46, forms a magnetic field, having the pole opposite to the pole of the inner magnetic body 45, within a body inner space 6.

Further, a magnetic field having the pole opposite to the pole of the inner space 6 is formed within an outer space 8 formed between the neighboring permanent magnets 40 due to formation of a pair of poles.

Further, according to confirmation through experimentation by the inventors of the present invention, polarities of magnetic force acting on an entrance side 10 and an exit side 12 of the tunnel-type body 4 are rapidly changed so that magnetic border membranes 14 having different polarities at both sides thereof are formed. That is, polarities of both sides of the magnetic border membrane 14 become rapidly different and, thus, an N pole and an S pole are formed in a space to produce a spatial magnet.

As a result of formation of a spatial magnetic field using actual magnetic force, the inventors of the present invention found a method for forming a spatial magnet using magnetic force and formation of the magnetic border membrane 14. Through experimentation, it may be confirmed that, when the tunnel-type body 4 consisting of the permanent magnets 40 is formed such that the inside and the outside of the tunnel-type body 4 have different poles, for example, the magnets 40 are attached to the tunnel-type body 4 such that the N pole of the magnets 40 faces the outer surface of the tunnel-type body 4 and the S pole of the magnets 40 faces the inner surface of the tunnel-type body 4, polarity of the N pole relatively strongly acts on the inner space 6 of the tunnel-type body 4.

Figure 8:
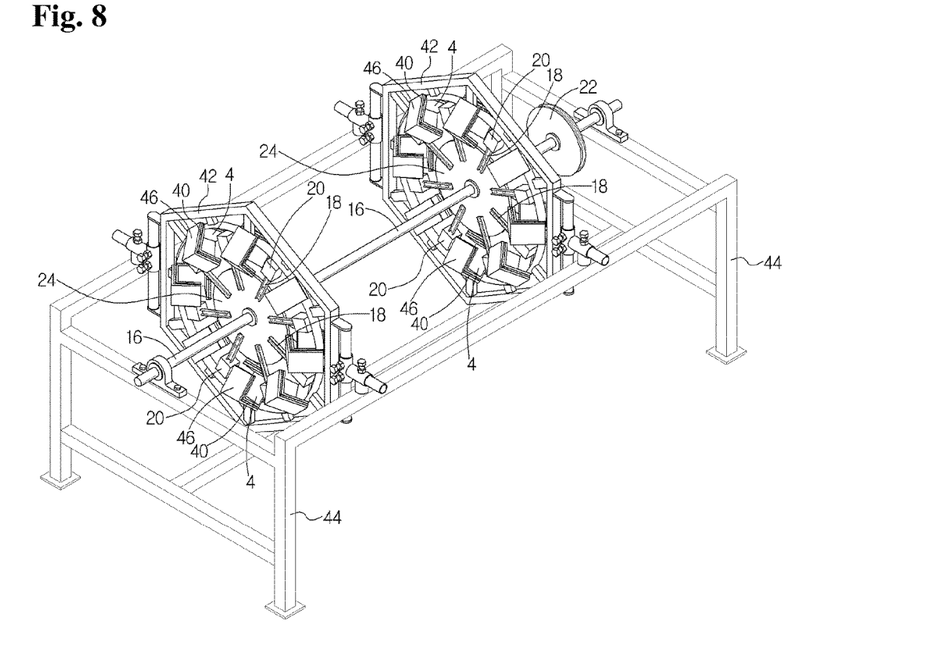
FIG. 8 is a perspective view of a power generation device using magnetic force in accordance with another embodiment of the present invention.
Figure 9:
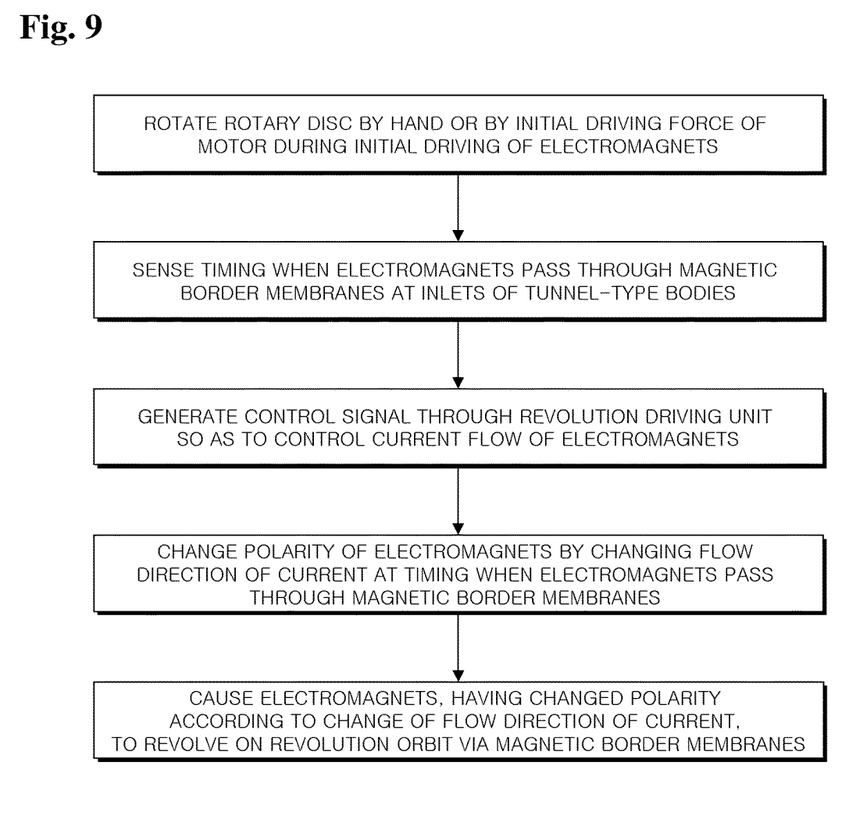
FIG. 9 is a flowchart illustrating a control method of a power generation device in accordance with one embodiment of the present invention.
Figure 10:
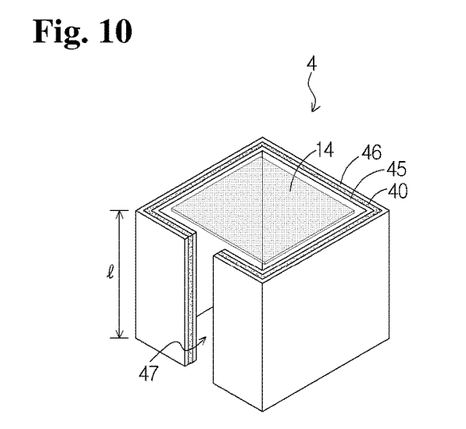
FIGS. 10 and 11 are views illustrating shapes and positions of magnetic border membranes according to examples of tunnel-type bodies.
Figure 11:
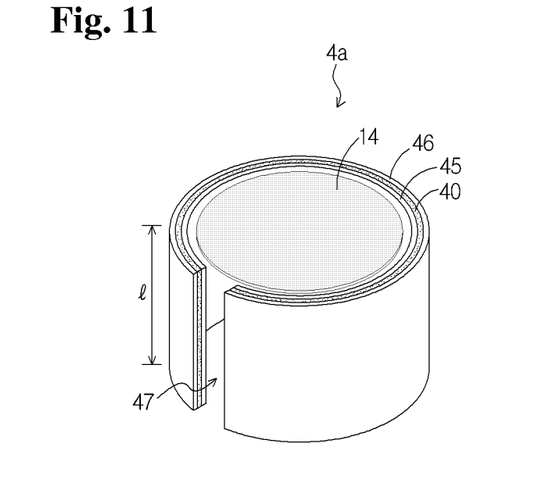

Through experimentation, the inventors of the present invention confirmed that the magnetic border membranes 14 are formed at positions close to the entrance side and exit side of the tunnel-type body 4 to which the permanent magnets 40 are attached (positions far from the entrance side and exit side by 5-30 mm), as exemplarily shown in FIGS. 8 and 9. Further, poles acting on the inside and the outside of the tunnel-type body 4 are relatively different based on the magnetic border membranes 14 formed at both sides of the tunnel-type body 4. That is, if the N pole strongly acts on one of the inside and outside of the tunnel-type body 4, the S pole relatively strongly acts on the other and, thus, a spatial magnet is formed as if it has different poles at both sides.

The spatial magnet described in the present invention does not indicate the pole in a specific space but indicates only a pole relatively strongly acting on a space out of poles acting on the space.

Although N and S poles of magnetic force are present in any space, one pole out of both poles more strongly acts on the space and the pole relatively strongly acting on the space is referred to as a representative pole.

The spatial magnet described in the present invention is defined by indicating the representative pole of a space.

In the spatial magnet defined in the present invention, as different poles relatively act on both sides of the magnetic border membrane 14, magnetic force at a position where both poles contact each other, i.e., at a position of the magnetic border membrane 14, is strongest.

Therefore, since the magnetic border membrane 14 is invisible but is formed at a position of a spatial magnet where both poles contact each other, if a magnetic body passes through the tunnel-type body 4, the magnetic body does not move inwardly and outwardly based on the magnetic border membrane 14 and is stopped therein. The magnetic body is held by the magnetic border membrane 14 having the strongest magnetic force.

A magnet may only attract a magnetic body (attractive force). However, when a magnetic body is close to a configuration of magnets in the present invention, the magnetic body does not move forward in the tunnel-type body 4 or is not released from the inside of the tunnel-type body 4 but hangs in the air.

Force of the magnetic border membranes 14 formed by the tunnel-type bodies 4 increases in proportion to the size of the tunnel-type bodies 4 and the stacking number of the permanent magnets 40, and such force is magnetic energy of the tunnel-type bodies 4 formed by the permanent magnets 40.

When a general magnetic body having no polarity is put opposite the magnetic border membrane 14, the magnetic body is strongly attracted by the invisible magnetic border membrane 14 and then stopped at the magnetic border membrane, thus hanging in the air. The reason for this is that magnetic energy of the tunnel-type bodies 4 is concentrated on the magnetic border membranes 14.

In the present invention, the magnetic border membranes 14 on which such magnetic energy is concentrated are used. When polarity of electromagnets, formed by winding a copper coil on magnetic bodies, is changed at the moment when the electromagnets pass through the magnetic border membranes 14, the electromagnets may revolve on the revolution orbit 2.

Therefore, in the present invention, rotary power may be generated using the magnetic border membranes 14 on which magnetic energy is concentrated, at the inlets and outlets of the tunnel-type bodies 4 formed by stacking the permanent magnets 40.

FIG. 3 is a conceptual view of the power generation device in accordance with the present invention, the number of the tunnel-type bodies 4 having the permanent magnets 40 attached thereto is a multiple of two, and a separation distance between the tunnel-type bodies 4 is longer than the length l of the tunnel-type bodies 4.

In a preferred embodiment of the present invention, the separation distance between the tunnel-type bodies 4 may be set to be 2-3 times the length l of the tunnel-type bodies 4, as exemplarily shown in FIG. 3. Here, the permanent magnets 40 are attached to the tunnel-type bodies 4 so that the same magnetic field may be formed in the inner spaces 6 of all the tunnel-type bodies 4.

If the interval between the tunnel-type bodies 4 is excessively long (for example, exceeds 4 times the length l of the tunnel-type bodies 4), weak magnetic force is formed on the magnetic border membranes 14 between the tunnel-type bodies 4 and, if the interval between the tunnel-type bodies 4 is excessively short (for example, is ¼ the length l of the tunnel-type bodies 4), strong magnetic force is formed by the permanent magnets 40 and the electromagnets 20 are trapped by magnetic force and do not move and, thus, it is difficult for the electromagnets 20 to revolve.

The above-described number of the tunnel-type bodies 4 and the separation distance between the tunnel-type bodies 4 are exemplary and may be changed according to the size of the tunnel-type bodies 4, the size of the electromagnets 20, the intensity of magnetic force and the like.

Figure 4:
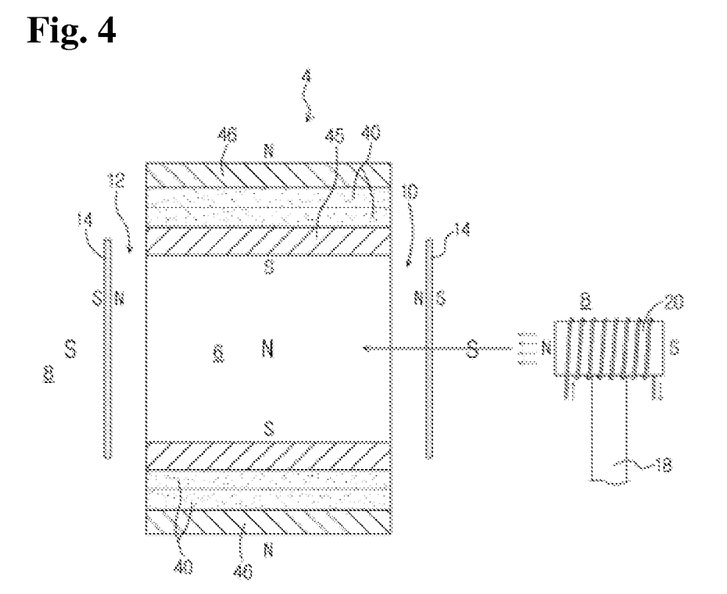
FIG. 4 is a view illustrating a principle of generating rotating power using magnetic force formed at the insides and outsides of the tunnel-type bodies and border membranes.

Now, the magnetic border membrane 14 will be described in more detail with reference to FIG. 4. Due to attachment of the permanent magnets 40, the S pole is formed on the inner magnetic body 45 and the N pole is formed on the outer magnetic body 46.

A magnetic field (magnetic force) by the N pole of the outer magnetic body 46 is formed in the body inner space 6 and a magnetic field (magnetic force) by a virtual S pole magnet is formed in the outer space 8 between the neighboring tunnel-type bodies 4.

Further, the magnetic border membranes 14, i.e., invisible virtual magnets having a thin thickness of less than several mm (1-7 mm), are formed at the entrance side 10 and the exit side 12 of the tunnel-type body 4, the inner surfaces of the magnetic border membranes 14 facing the entrance side 10 and the exit side 12 of the tunnel-type body 4 have the N pole, and the outer surfaces of the magnetic border membranes 14 have the S pole.

On the contrary, if the permanent magnets 40 are reversely attached so that the N pole is formed on the inner magnetic body 45 and the S pole is formed on the outer magnetic body 46, opposite polarity is formed.

That is, a magnetic field (magnetic force) by the S pole of the outer magnetic body 46 is formed in the body inner space 6 and a magnetic field (magnetic force) of the N pole is formed in the outer space 8 between the neighboring tunnel-type bodies 4.

Further, the inner surfaces of the magnetic border membranes 14 facing the entrance side 10 and the exit side 2 of the tunnel-type body 4 have the S pole which is the same as in the virtual magnet in the body inner space 6, and the outer surfaces of the magnetic border membranes 14 have the N pole.

Although the embodiment of the present invention states polarity of the tunnel-type bodies 4 to describe a driving principle, it will be understood that a space does not have a specific pole but indicates a pole relatively strongly acting in the space and directions of strongly acting poles may be changed according to configurations.

Using such a phenomenon, in the present invention, the electromagnets 20 may revolve along the revolution orbit 2 on which the tunnel-type bodies 4 and the magnetic border membranes 14 are placed and, thereby, rotating power of the rotary shaft 16 may be transmitted to the power transmission unit 22.

Figure 5:
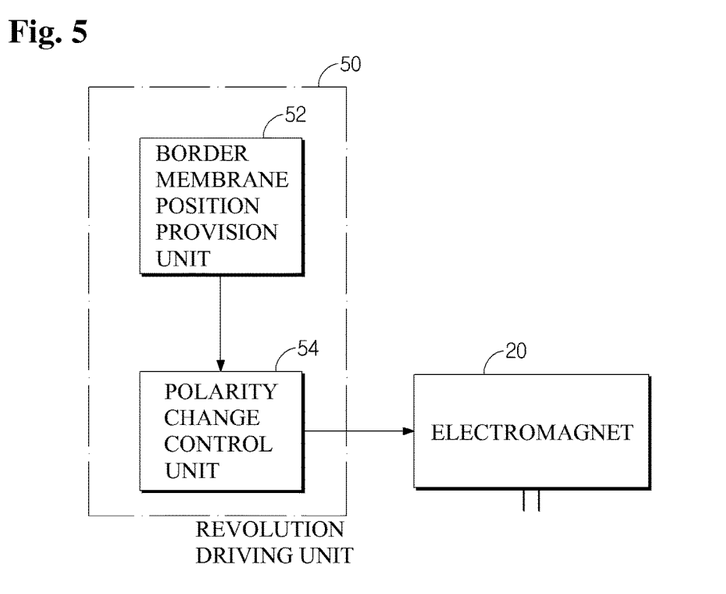
FIG. 5 is a block diagram of the power generation device using the tunnel-type bodies and magnetic force in accordance with the present invention.

For this purpose, in the present invention, in order to allow the electromagnets 20 placed on the revolution orbit 2 to revolve and pass through the tunnel-type bodies 4 and the magnetic border membranes 14, a revolution driving unit 50 to change the polarity of the electromagnets 20 is provided, as exemplarily shown in FIG. 5.

Prior to a description, the electromagnets 20 in accordance with the present invention may initially revolve by hand or be initially driven by a separate motor (not shown).

The revolution driving unit 50 includes a border membrane position provision unit 52 to provide the alignment positions of the magnetic border membranes 14 and a polarity change control unit 54 to change the polarity of the electromagnets 20 at the respective border membrane positions.

The border membrane position provision unit 52 may store arrangement angle information of the respective tunnel-type bodies 4 and positions of the magnetic border membranes 14 separated from the tunnel-type bodies 4, input by a designer, within an inner memory and then provide border membrane positions to the polarity change control unit 54.

The magnetic border membranes 14 located at the entrance sides 10 and the exit sides 12 of the tunnel-type bodies 4 are formed at positions spaced from the entrance sides 10 and the exit sides 12 by a distance of 5~30 mm.

The polarity change control unit 54 may change the polarity of the electromagnets 20 activated by supply of electricity, in front of and at the rear of the positions of the magnetic border membranes 14, provided from the border membrane position provision unit 52, thus causing the electromagnets 20 to smoothly pass through the magnetic border membranes 14 of the tunnel-type bodies 4 and to acquire propulsive force therethrough.

In the present invention, in order to axially revolving force of the electromagnets 20 based on magnetic force of the permanent magnets 40 attached to the tunnel-type bodies 40, preferably, a plurality of permanent magnets 40 may be stacked and, more preferably, the permanent magnets 40 may be covered by the outer magnetic body 46.

Through experimentation, the inventors of the present invention confirmed that, if the permanent magnets 40 are stacked only to increase magnetic force, when a plurality of permanent magnets 40 is attached to the inner magnetic body 45, increase in magnetic force is not proportional to increase in the number of the permanent magnets 6 and, when the permanent magnets 40 are stacked and then the outer magnetic body 46 is attached thereto, increase in magnetic force is arithmetically proportional to increase in the number of the permanent magnets 6.

That is, by attaching the outer magnetic body 46 again to the permanent magnets 6 attached to the inner magnetic body 45, magnetic force of the tunnel-type body 4 increases in proportion to increase in the number of the permanent magnets 6 attached to the inner magnetic body 45.

Arrangement of the tunnel-type bodies 4 provided in a multiple of two on the revolution orbit 2 is advantageous to polarity change control of the electromagnets 20, and the respective tunnel-type bodies 4 may have the same body length as the diameter (or the minimum inner width) of the tunnel-type bodies 4 so as to increase axially revolving force of the electromagnets 20.

In the present invention, revolving force is acquired by executing electrical control in which the electromagnets 20 acquire propulsive force by passing through the tunnel-type bodies 4 having the permanent magnets 40 attached thereto and the magnetic border membranes 14.

For example, the power generation device having the configuration shown in FIG. 3, if the electromagnet 20 is located in the outer space 8 of the tunnel-type body 4, controls the electromagnet 20 so as to form the N pole at the front portion of the electromagnet 20 and the electromagnet 20 moves forward to the magnetic border membrane 14 of the entrance side 10 of the tunnel-type body 4 by magnetic force, i.e., attractive force of the electromagnet 20 by the S pole of the outer surface of the electromagnet border membrane 14.

Figure 6:
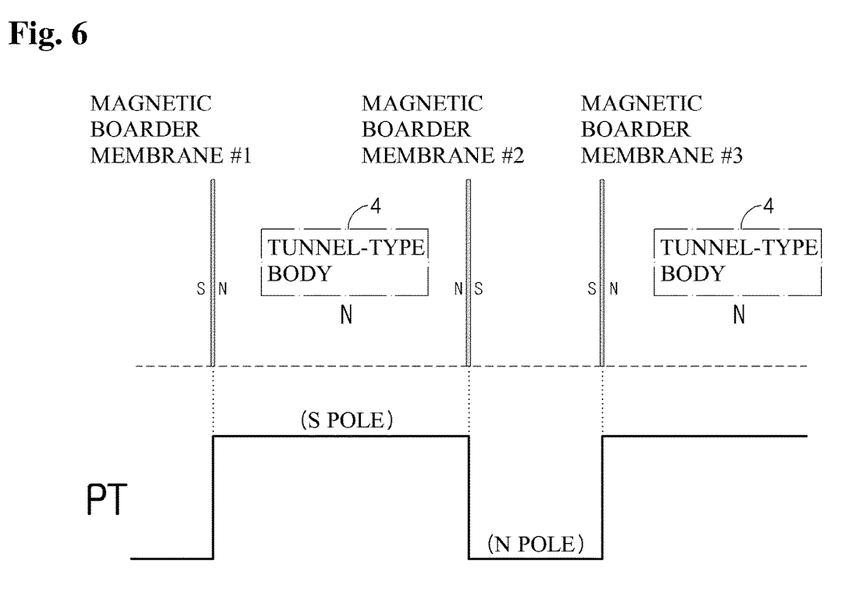
FIG. 6 is a view illustrating timing to control the positions of the magnetic border membranes and change of polarity of the electromagnets in accordance with the present invention.

Thereafter, at the moment when the electromagnet 20 is close the magnetic border membrane 14 and progress based on inertial force, if the power generation device controls the electromagnet 20 so as to form the S pole at the front portion of the electromagnet 20 using polarity change current PT (with reference to FIG. 6) of the polarity change control unit 54, magnetic force of the N pole formed in the inner space 6 of the tunnel-type body 4 attracts the S pole formed at the front portion of the electromagnet 20 so that the electromagnet 20 passes through the inner space 6 of the tunnel-type body 4.

At the moment when the electromagnet 20 passes through the border membrane 12 at the exit side 12 of the tunnel-type body 4 based on inertial force, if the power generation device controls the electromagnet 20 so as to form the N pole at the front portion of the electromagnet 20 using polarity change current PT (with reference to FIG. 6) of the polarity change control unit 54, the S pole formed at the front portion of the electromagnet 20 is attracted by the magnetic field of the S pole in the outer space 8 and repelled by the magnetic field of the N pole in the inner space 6 of the tunnel-type body 4 so that the electromagnet 20 moves to the outer space 6.

By such polarity change control of the electromagnets 20 by the polarity change control unit 54, the electromagnets 20 revolve and, thus, the rotary shaft 16 generates rotating power.

Figure 7:
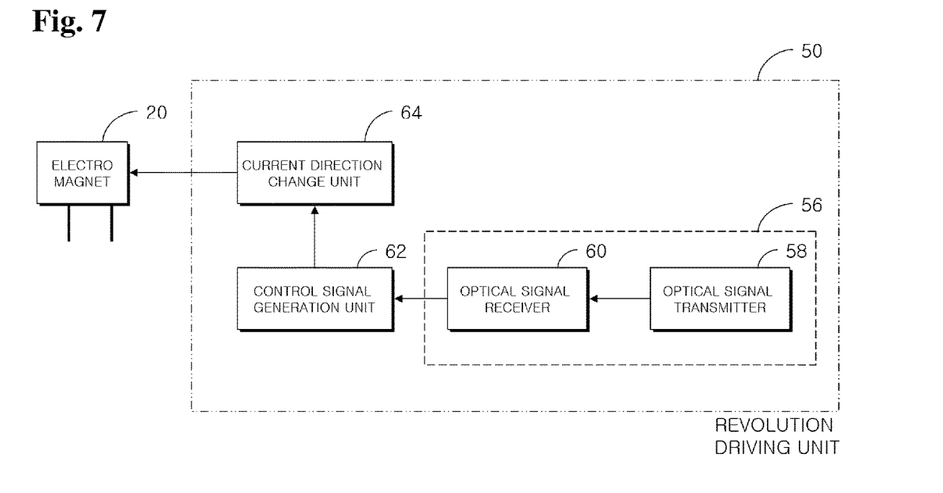
FIG. 7 is a block diagram illustrating another exemplary revolution driving unit in accordance with the present invention.

FIG. 7 is a block diagram illustrating another exemplary revolution driving unit 50 in accordance with the present invention.

In the present invention, as the electromagnets 20 revolve, the rotary disc 24 fixing the electromagnets 20 is rotated and, thus, optical sensing units 56 are installed at opposite positions of both sides of the rotary disc 24 and generate a polarity change signal for the electromagnets 20.

In more detail, the optical sensing units 56, each of which includes an optical signal transmitter 58 and an optical signal receiver 60, are provided at both sides of the rotary disc 24 and passages for optical signal transmission/reception are formed on the rotary disc 24 corresponding to the positions of the optical sensing units 56.

The number of the passages for optical signal transmission/reception formed on the rotary disc 24 may be twice as many the number of the installed tunnel-type bodies 4, i.e., the same as the number of the magnetic border membranes 14, and the passages for optical signal transmission/reception may be formed at positions where a signal may be transmitted to the optical signal receivers 60 through the optical signal transmitters 58 at the timing when the electromagnets 20 pass through the magnetic border membranes 14 of the tunnel-type bodies 14.

That is, the optical sensing units 56 are operated at the timing when the electromagnets 20 pass through the magnetic border membranes 14, and the optical signal is interrupted by the rotary disc 24 when the electromagnets 20 pass through the tunnel-type bodies 4.

When the rotary disc 24 is rotated together with revolution of the electromagnets 20 and an optical signal transmission direction coincides with the passages so that the optical signal passes through the rotary disc 24 and is transmitted to the optical signal receivers 60, the signal sensed by the optical signal receivers 60 is transmitted to a control signal generation unit 62.

The control signal generation unit 62 generates a control signal to change polarity of the electromagnets 20 based on the signal sensed by the optical signal receivers 60, and the generated control signal is transmitted to a current direction change unit 64 so that the direction of current applied to the electromagnets is changed to change the direction of polarity of the electromagnets.

By changing the direction of polarity of the electromagnets 20 at the timing when the electromagnets 20 pass through the magnetic border membranes 14, the electromagnets 20 may continuously revolve.

If current supplied to the electromagnets 20 is alternating current (AC), the electromagnets 20 may be controlled so as to pass through the magnetic border membranes 14 by changing polarity of current supplied to the electromagnets 20 by adjusting hertz (Hz).

In the power generation device of the present invention, if current to change polarity of the electromagnets 20 is supplied and then the electromagnets 20 revolve for a long time, heat is generated from the electromagnets 20 and may cause malfunction of the electromagnets 20. Therefore, the power generation device of the present invention requires removal of generated heat.

In the present invention, a passage for circulation of air is formed in the core of the electromagnet 20 having a coil wound thereon and, as the electromagnets 20 revolve, heat generated from the electromagnets 20 is removed by circulating air through the passages of the electromagnets 20.

Particularly, in cold areas, it is easy to remove heat generated from the electromagnets 20 using the above-described air cooling method.

Further, a water cooling method in which heat generated from the electromagnets 20 is removed by supplying cooling water to passages formed in the electromagnets 20 and then circulating the cooling water may be used.

Although the above-described embodiment of the present invention describes a structure in which the tunnel-type bodies 4 having the permanent magnets 40 attached thereto are fixed and the electromagnets 20, the arms 18 and the rotary shaft 16 are rotated, it may be understood that, in accordance with another embodiment of the present invention, the tunnel-type bodies 4 having the permanent magnets 40 attached thereto may be rotated and the electromagnets 20 and the arms 18 may be fixed. In this case, a plurality of revolving tunnel-type bodies 4 is fixed to one rotating body axially connected to the power transmission unit 22.

That is, a plurality of tunnel-type bodies 4 having unilateral open passages 47 on the revolution orbit 2 is arranged on a ring-type bracket 42 at the same interval and fixed to the rotating body so as to revolve, and the rotating body transmits rotating power to the power transmission unit 22.

A plurality of permanent magnets 40 is attached to the outer surface of the inner magnetic body 45 of the revolving tunnel-type bodies 4, i.e., between the inner magnetic body 45 and the outer magnetic body 46, so that poles of the permanent magnets 40 facing the inner and outer magnetic bodies 45 and 46 are opposite, thereby forming a magnetic field within the body inner spaces 6.

A magnetic field having the pole opposite to the pole of the magnetic field formed in the inner space 6 is formed in the outer space 8 between the neighboring tunnel-type bodies 4 and the magnetic border membranes 14 having opposite poles on the inner and outer surfaces thereof are formed at the entrance side 10 and the exit side 12 of the tunnel-type body 4.

The same number of the electromagnets 20 as the number of the tunnel-type bodies 20 is fixedly arranged on the revolution orbit 2, and the revolution driving unit 50 to change the polarity of the electromagnets 20 so that the tunnel-type bodies 4 revolving along the revolution orbit 2 revolve via the electromagnets 20 and the magnetic border membranes 14 is provided.

In accordance with another embodiment of the present invention, as exemplarily shown in FIG. 8, one or more power generation devices may be installed on a main body frame 44 and rotating power generated from each power generation device may be transmitted to a power transmission unit 22 by an rotary shaft 16, thereby generating high intensity rotating power.

Hereinafter, with reference to FIG. 9, a control method for driving the power generation device using magnetic force in accordance with the present invention will be described.

First, in order to initially drive the electromagnets 20 revolving via the tunnel-type bodies 4 installed on the revolution orbit 2, the rotary disc 24 is rotated by hand or by a separator motor.

As the rotary disc 2 is initially rotated, the electromagnets 20 installed at one side of the rotary disc 2 pass through the tunnel-type bodies 4. Here, the revolution driving unit 50 senses the timing when the electromagnets 20 pass through the magnetic border membranes 14 formed at the entrance sides 10 and the exit sides 12 of the tunnel-type bodies 4 and generates a control signal to control the flow of current applied to the electromagnets 20.

By changing the direction of the flow of current applied to the electromagnets 20 after generation of the current control signal through the revolution driving unit 50, the polarity direction of the electromagnets 20 is changed at the timing when the electromagnets 20 pass through the magnetic border membranes 14.

When the polarity direction of the electromagnets 20 is changed to the opposite direction, the electromagnets 20 pass through the tunnel-type bodies 4 by propulsive force generated by magnetic force acting on the insides of the tunnel-type bodies 4 which attracts the front portions of the electromagnets 20 having opposite polarity to the magnetic force in the tunnel-type bodies 4 and pushes the rear portions of the electromagnets 20 having the same pole to the magnetic force.

Even if the electromagnets 20 exit the tunnel-type bodies 4 and then pass through the magnetic border membranes 14 of the exit sides 12, by changing the direction of the flow of current so that the electromagnets 20 have opposite polarity, the electromagnets 20 move to the magnetic border membranes 14 formed at the entrance sides 10 of the neighboring tunnel-type bodies 4 by the same propulsive force and thus, the electromagnets 20 may continuously revolve.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A power generation device using magnetic force, the power generation device comprising:
   a plurality of tunnel-type bodies having unilateral open passages and fixedly arranged at the same interval on a revolution orbit, a plurality of permanent magnets being provided between an inner magnetic body and an outer magnetic body of each tunnel-type body such that the permanent magnets facing the inner and outer magnetic bodies have opposite polarities so as to form magnetic fields within body inner spaces;
   magnetic border membranes formed in outer spaces between the neighboring tunnel-type bodies so as to form magnetic fields having the opposite pole to the pole of the magnetic fields formed in the inner spaces and having opposite poles on the inner and outer surfaces thereof, provided at entrance sides and exit sides of the tunnel-type bodies;
   electromagnets prepared in the same number as the number of the tunnel-type bodies and installed on the revolution orbit so as to revolve along the revolution orbit; and
   a revolution driving unit configured to change polarity of the electromagnets so that the electromagnets placed on the revolution orbit may revolve via the tunnel-type bodies and the magnetic border membranes.

2. A power generation device using magnetic force, the power generation device comprising:
   a plurality of tunnel-type bodies having unilateral open passages, arranged at the same interval on a revolution orbit and fixed to a rotating body so as to revolve, the rotating body being configured to transmit rotating power to a power transmission unit and a plurality of permanent magnets being provided between an inner magnetic body and an outer magnetic body of each tunnel-type body such that the permanent magnets facing the inner and outer magnetic bodies have opposite polarities so as to form magnetic fields within body inner spaces;

magnetic border membranes formed in outer spaces between the neighboring tunnel-type bodies so as to form magnetic fields having the opposite pole to the pole of the magnetic fields formed in the inner spaces and having opposite poles on the inner and outer surfaces thereof, provided at entrance sides and exit sides of the tunnel-type bodies;

electromagnets prepared in the same number as the number of the tunnel-type bodies and arranged on the revolution orbit; and a revolution driving unit configured to change polarity of the electromagnets so that the tunnel-type bodies placed on the revolution orbit may revolve via the electromagnets and the magnetic border membranes.

3. The power generation device using magnetic force according to claim 1, wherein the revolution driving unit includes a border membrane position provision unit configured to provide the alignment positions of the magnetic border membranes and a polarity change control unit configured to change the polarity of the electromagnets at the respective border membrane positions.

4. The power generation device using magnetic force according to claim 1, wherein the revolution driving unit includes optical sensing units including optical signal transmitters and receivers installed at both sides of a rotary disc to transmit and receive an optical signal, a control signal generation unit configured to generate a control signal to change polarity of the electromagnets based on the signal sensed by the optical sensing units, and a current direction change unit configured to change the direction of current applied to the electromagnets based on the generated control signal.

5. The power generation device using magnetic force according to claim 1, wherein the tunnel-type bodies have one of a cylindrical shape and a polyprism shape including a rhombic prism or a rectangular prism.

6. The power generation device using magnetic force according to claim 2, wherein the revolution driving unit includes a border membrane position provision unit configured to provide the alignment positions of the magnetic border membranes and a polarity change control unit configured to change the polarity of the electromagnets at the respective border membrane positions.

7. The power generation device using magnetic force according to claim 2, wherein the revolution driving unit includes optical sensing units including optical signal transmitters and receivers installed at both sides of a rotary disc to transmit and receive an optical signal, a control signal generation unit configured to generate a control signal to change polarity of the electromagnets based on the signal sensed by the optical sensing units, and a current direction change unit configured to change the direction of current applied to the electromagnets based on the generated control signal.

8. The power generation device using magnetic force according to claim 2, wherein the tunnel-type bodies have one of a cylindrical shape and a polyprism shape including a rhombic prism or a rectangular prism.

9. The power generation device using magnetic force according to claim 1, wherein magnetic force spaces having one of the N pole and S pole acting thereon according to the attachment direction of the permanent magnets are formed within the tunnel-type bodies.

10. The power generation device using magnetic force according to claim 2, wherein magnetic force spaces having one of the N pole and S pole acting thereon according to the attachment direction of the permanent magnets are formed within the tunnel-type bodies.

11. A power generation device using magnetic force, the power generation device comprising:
electromagnets revolving and installed at front ends of a plurality of arms installed at the same interval and axially extending on a rotary disc installed at one end of on an rotary shaft installed across the left and right sides of a main body frame;
a plurality of tunnel-type bodies installed on a revolution orbit of the revolving electromagnets, fixed to a ring-type bracket and having magnetic force spaces formed therein by permanent magnets, the permanent magnets and an outer magnetic body being stacked on the outer surface of an inner magnetic body of each of the tunnel-type bodies; and
a revolution driving unit configured to change polarity of the electromagnets through control of the flow direction of current in consideration of polarity of the tunnel-type bodies placed on the revolution orbit during revolution of the electromagnets.

12. A control method of a power generation device using magnetic force, the control method comprising:
revolving electromagnets by applying initial driving force thereto so that the electromagnets may pass through tunnel-type bodies having inner and outer magnetic bodies and permanent magnets stacked on one another;
sensing timing when the electromagnets pass through magnetic border membranes 14 formed by the tunnel-type bodies and generating a control signal through a revolution driving unit so as to control the flow of current applied to the electromagnets;
changing the polarity direction of the electromagnets to the opposite direction by changing the flow direction of current applied to the electromagnets based on the current control signal generated through the revolution driving unit; and
revolving the electromagnets via the tunnel-type bodies by propulsive force, generated due to magnetic force acting on the insides of the tunnel-type bodies to attract the front portions of the electromagnets having the opposite pole to the magnetic force and magnetic force acting on the outsides of the tunnel-type bodies to push the rear portions of the electromagnets having the same pole as the magnetic force, by changing the polarity direction of the electromagnets in consideration of the timing when the electromagnets pass through the magnetic border membranes located between the tunnel-type bodies.

13. The control method according to claim 12, wherein the revolution driving unit stores arrangement angle information of the tunnel-type bodies and position information of the magnetic border membranes and changes the flow direction of current at the timing when the electromagnets revolving on the revolution orbit pass through the magnetic border membranes so that the polarity direction of the electromagnets is changed to the opposite direction and thus the electromagnets pass through the tunnel-type bodies.

14. The control method according to claim 12, wherein the revolution driving unit generates a polarity change control signal by signal transmission/reception of optical sensing units installed at both sides of a rotary disc rotated together with revolution of the electromagnets and changes the flow direction of current, if the optical sensing units sense a signal at the timing when the electromagnets revolving on the revolution orbit pass through the magnetic border membranes, so that the polarity direction of the electromagnets is changed to the opposite direction and thus the electromagnets pass through the tunnel-type bodies.

* * * * *